United States Patent
Ishida et al.

(10) Patent No.: US 7,857,721 B2
(45) Date of Patent: Dec. 28, 2010

(54) BELT-TYPE CONTINUOUSLY VARIABLE TRANSMISSION AND STRADDLE-TYPE VEHICLE

(75) Inventors: Yousuke Ishida, Shizuoka (JP); Akifumi Oishi, Shizuoka (JP); Takuji Murayama, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 147 days.

(21) Appl. No.: 11/776,403

(22) Filed: Jul. 11, 2007

(65) Prior Publication Data

US 2008/0015068 A1    Jan. 17, 2008

(30) Foreign Application Priority Data

Jul. 12, 2006 (JP) ............................. 2006-191133
Dec. 27, 2006 (JP) ............................. 2006-351053

(51) Int. Cl.
*F16H 7/02* (2006.01)
(52) U.S. Cl. .......................................... 474/188; 474/8
(58) Field of Classification Search ......... 474/188–189, 474/166–167, 190–194, 8
See application file for complete search history.

(56) References Cited

U.S. PATENT DOCUMENTS

| | | | |
|---|---|---|---|
| 4,810,237 A * | 3/1989 | Mantovaara | 474/166 |
| 6,254,503 B1 * | 7/2001 | Chiba et al. | 474/8 |
| 7,276,002 B2 | 10/2007 | Wang et al. | |
| 2002/0032088 A1 * | 3/2002 | Korenjak et al. | 474/14 |
| 2004/0053723 A1 * | 3/2004 | Smeets | 474/242 |
| 2005/0090340 A1 | 4/2005 | Wang et al. | |
| 2005/0221938 A1 * | 10/2005 | Yoshida et al. | 474/242 |
| 2006/0058126 A1 * | 3/2006 | Faust | 474/8 |
| 2007/0004543 A1 * | 1/2007 | Ishida | 474/8 |

FOREIGN PATENT DOCUMENTS

| | | |
|---|---|---|
| EP | 0997670 A3 | 10/2000 |
| EP | 1605187 A1 | 12/2005 |
| JP | 2001343056 A | 12/2001 |
| JP | 2002-070992 | 3/2002 |

OTHER PUBLICATIONS

European Search Report for corresponding European application 07013034 lists the references above.

* cited by examiner

*Primary Examiner*—Robert A Siconolfi
*Assistant Examiner*—Anna Momper
(74) *Attorney, Agent, or Firm*—Keating & Bennett, LLP

(57) ABSTRACT

Abrasion of a V-belt in a belt type continuously variable transmission accommodated in an engine unit of a motorcycle is suppressed. A V-belt wound around and contacting a primary sheave and a secondary sheave 72 is at least partially formed from a resin. A plurality of grooves aligned at a predetermined pitch in a radial direction are formed on sheave surfaces of the primary and secondary sheaves. The average pitch P(mm) of the grooves is $P \leq -0.08K \times 10^{-3} + 0.18$, where K(Hv) indicates surface hardness of the sheave surfaces.

20 Claims, 22 Drawing Sheets

| SPECIMEN NO. | SURFACE MATERIAL | PROCESSING PITCH (mm) | HARDNESS (Hv) | ABRADED STATE | Ra (μm) | Rz (μm) |
|---|---|---|---|---|---|---|
| No. 1 | HARD CHROME PLATING | 0.05 | 1000 | GOOD | 0.13 | 0.86 |
| No. 2 | SCM420 CARBURIZING | 0.08 | 600 | GOOD | 0.72 | 2.84 |
| No. 3 | SUS304 | 0.10 | 400 | GOOD | 1.03 | 4.2 |

(b)

| SPECIMEN NO. | SURFACE MATERIAL | PROCESSING PITCH (mm) | HARDNESS (Hv) | ABRADED STATE | Ra (μm) | Rz (μm) |
|---|---|---|---|---|---|---|
| No. 1 | HARD CHROME PLATING | 0.05 | 1000 | GOOD | 0.13 | 0.86 |
| No. 4 | HARD CHROME PLATING | 0.10 | 1000 | GOOD | 0.84 | 3.31 |
| No. 5 | HARD CHROME PLATING | 0.17 | 1000 | NO GOOD | 2.87 | 11.1 |

[Fig. 12]
(a)
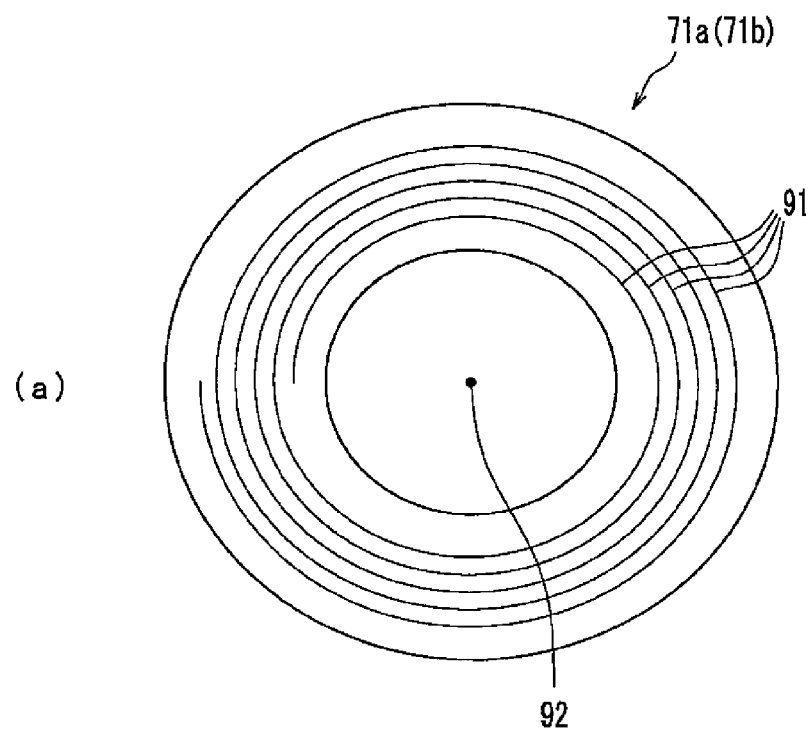
(b)
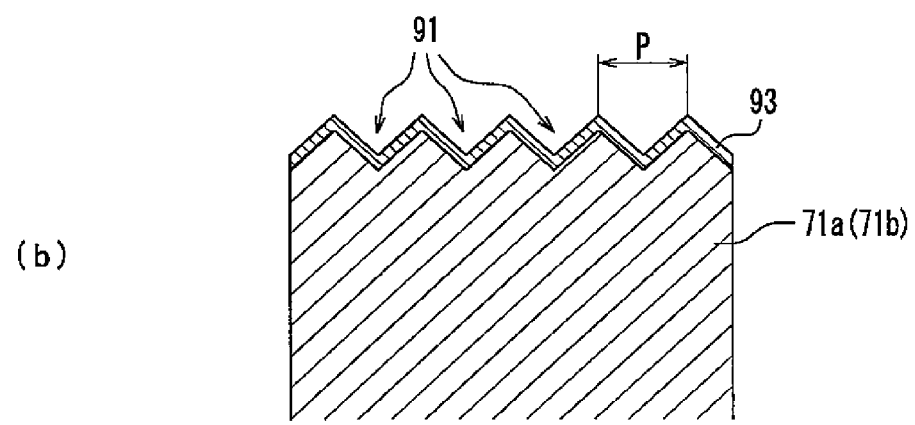

[Fig. 13]
(a)
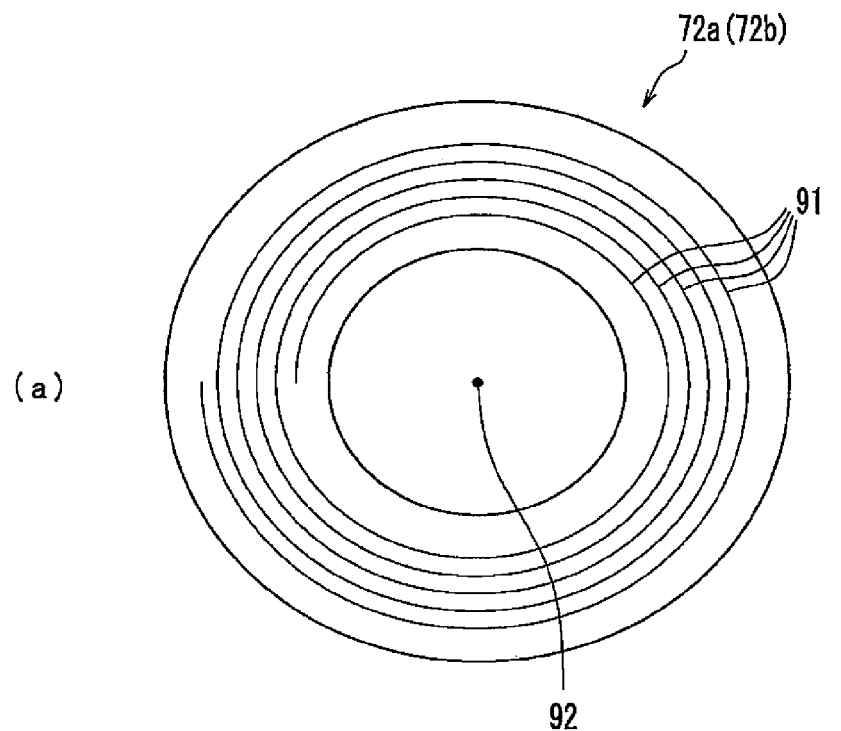
(b)
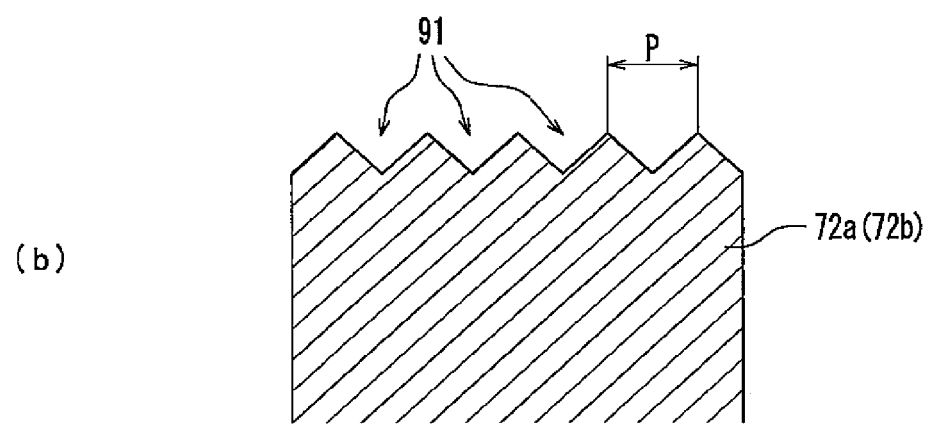

[Fig. 14]
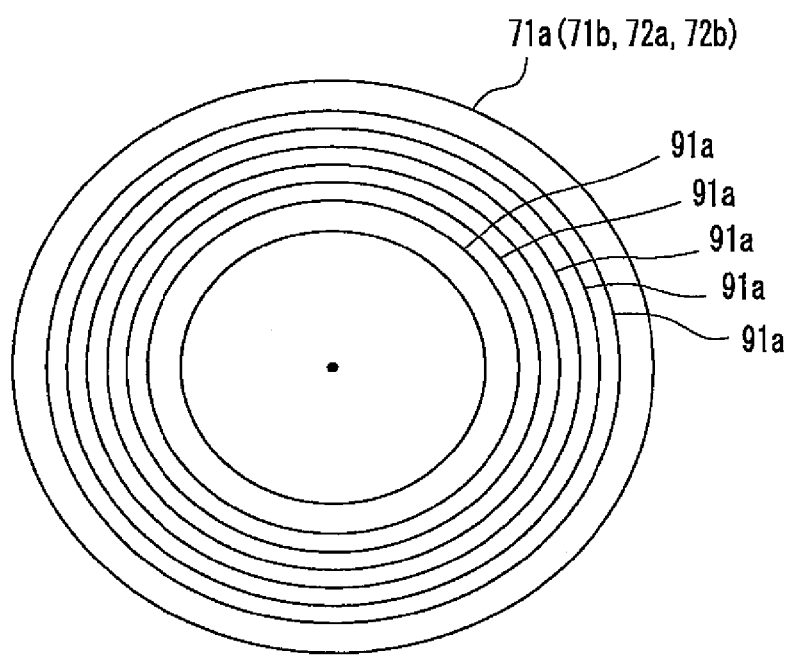

[Fig. 15]
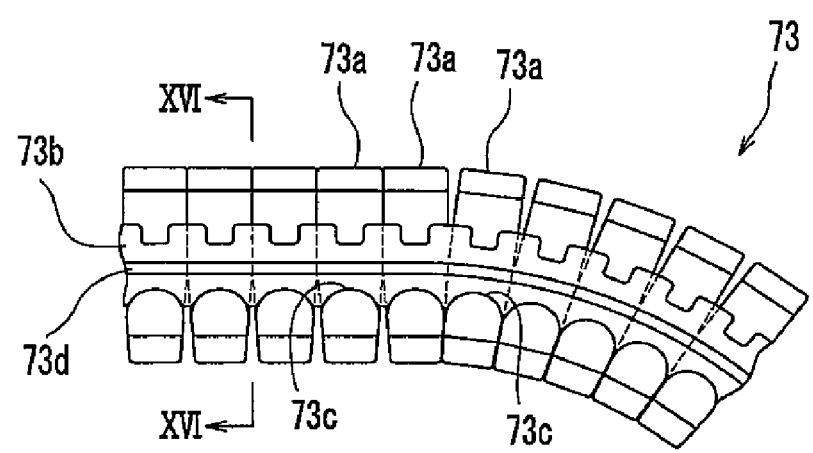

[Fig. 16]
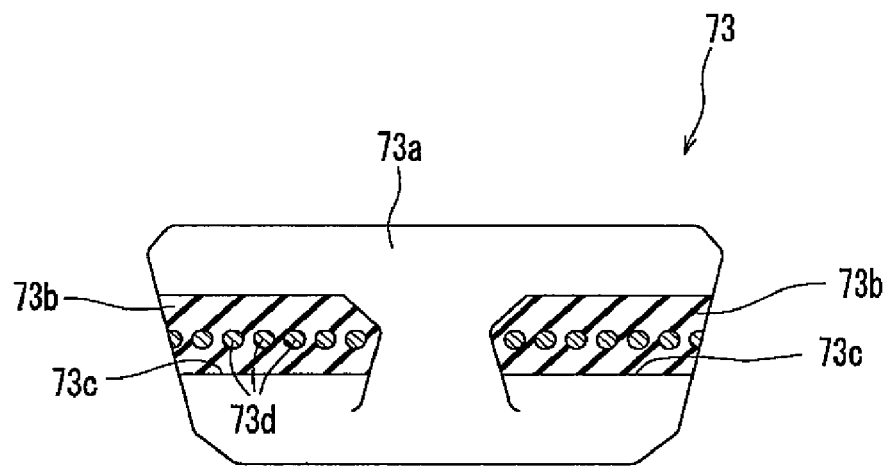

[Fig. 17]
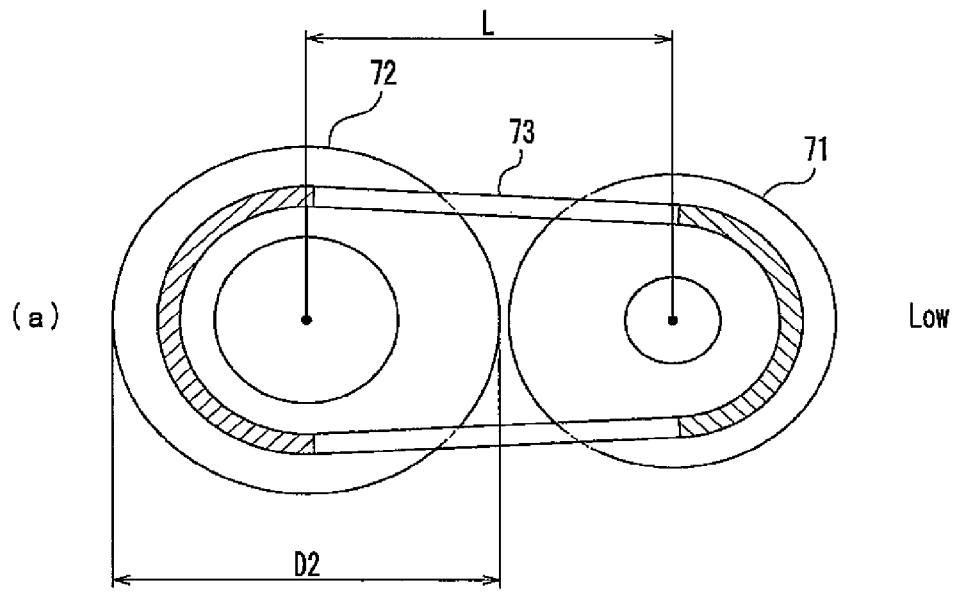
(a) Low
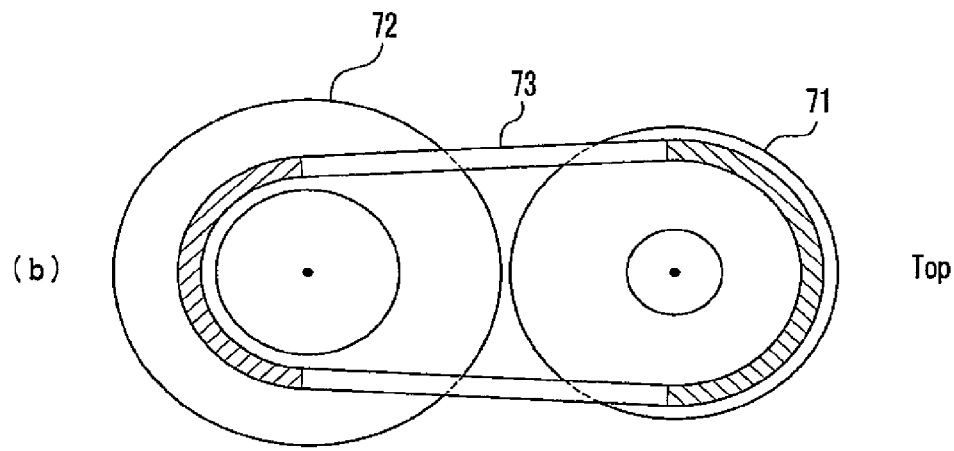
(b) Top

[Fig. 18]
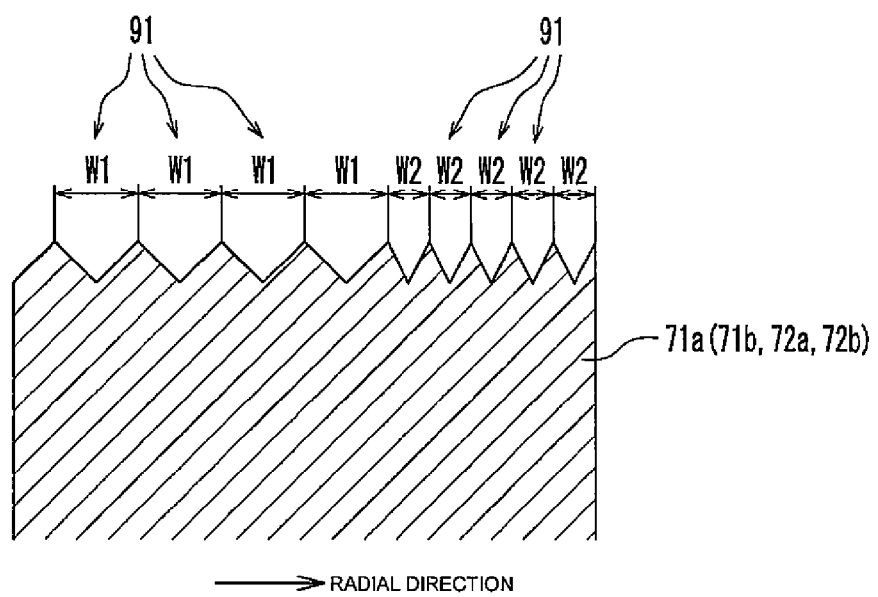

[Fig. 19]
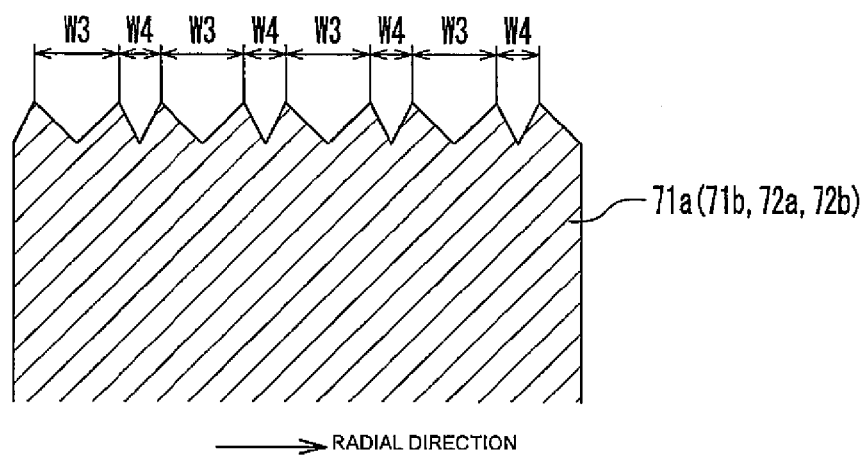

[Fig. 20]
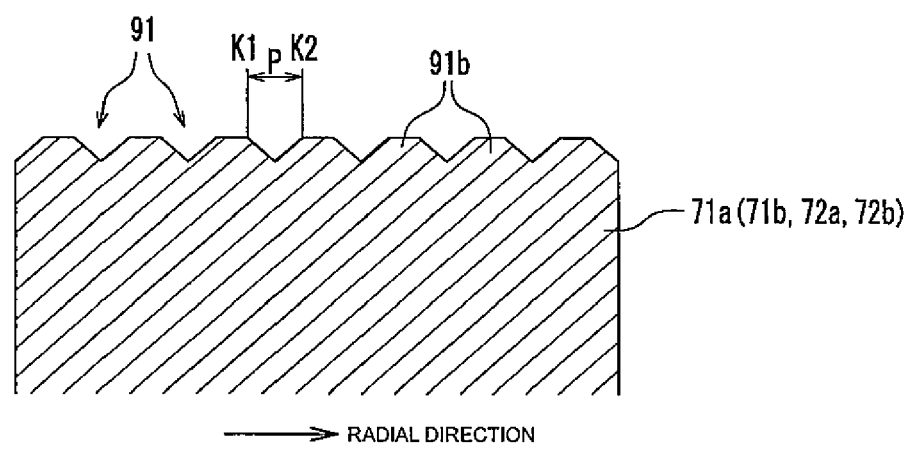

[Fig. 21]
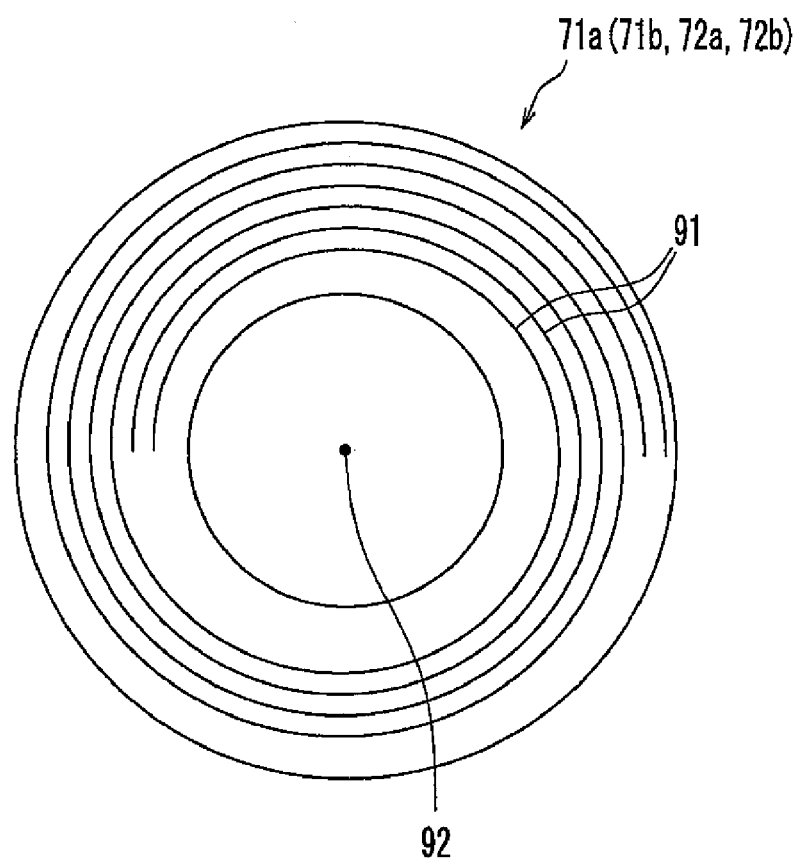

[Fig. 22]
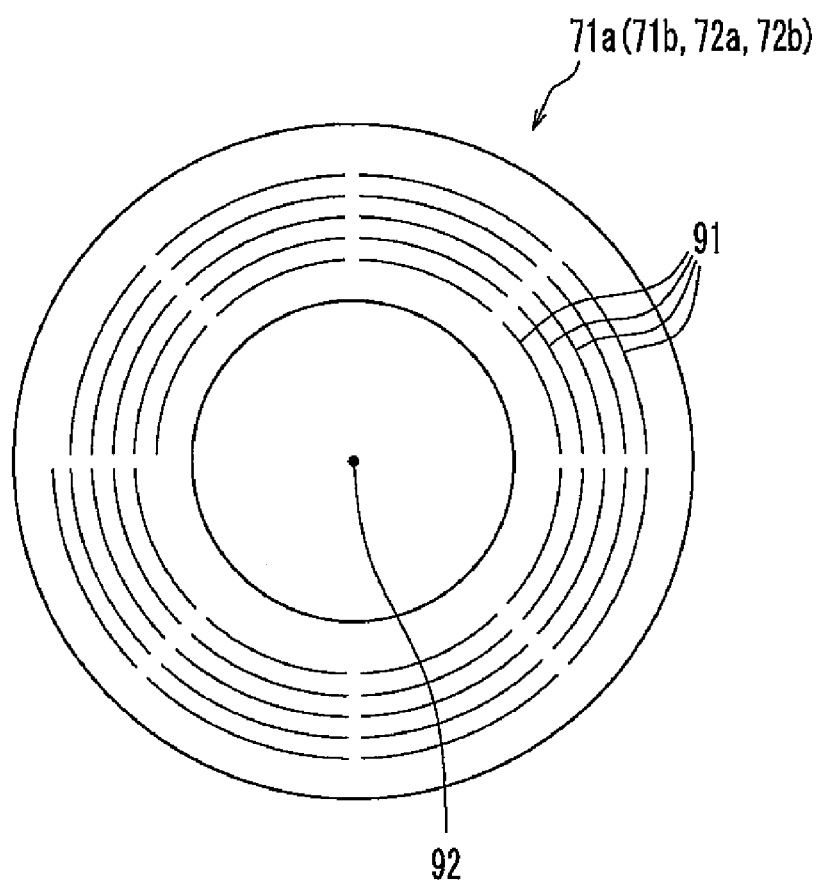

_BELT-TYPE CONTINUOUSLY VARIABLE TRANSMISSION AND STRADDLE-TYPE VEHICLE_

RELATED APPLICATIONS

This application claims the benefit of priority under 35 USC 119 of Japanese patent application nos. 2006-191133, filed on Jul. 12, 2006; and 2006-351053, filed on Dec. 27, 2006, which applications are hereby incorporated by reference in their entireties.

BACKGROUND OF THE INVENTION

1. Field of the Invention

The present invention relates to a belt type continuously variable transmission for a straddle type vehicle.

2. Description of Related Art

Straddle type vehicles provided with a belt type continuously variable transmission are known. The belt type continuously variable transmission comprises a primary sheave, to which driving force from an engine is transmitted, and a secondary sheave, to which driving force is transmitted through a V-belt from the primary sheave. A speed reduction ration varies in accordance with a ratio of a diameter, at which a belt is wound round the primary sheave, and a diameter, at which the belt is wound round the secondary sheave.

Belt type continuously variable transmissions are usually used in a "dry environment" in which oil, moisture content, etc. do not enter. In order to favorably transmit driving force, a frictional force of a certain measure is needed between a sheave and a V-belt. However, states of contact/non-contact are switched over between the V-belt and the sheave as the V-belt runs, so that some lubricating ability is needed between the sheave and the V-belt. With no lubricating ability, heat is generated due to friction between the V-belt and the sheave.

It is thought that lubricating ability between the sheave and the V-belt is provided mainly by abrasion powder generated from the V-belt. Abrasion powder generated by contact with a sheave is held on a portion of the sheave in contact with the V-belt whereby the sheave and the V-belt slide relative to each other while maintaining a frictional force of a certain measure. When the sheave surface is smooth, however, the abrasion powder cannot be suitably held on the sheave surface and it becomes difficult to preserve a lubricating ability between the sheave and the V-belt. Accordingly, irregularities are needed on the sheave surface to hold the abrasion powder.

However, irregularities on the sheave surface make the V-belt liable to abrade. Therefore, when the irregularities are excessively large in magnitude, the service life of the V-belt is decreased. Thus, the irregularities are preferably limited in magnitude to a predetermined range.

Patent Gazette No. 3609754 describes that if the portion of the V-belt that is in contact with the sheave surface is formed from a resin, abrasion loss of the V-belt is reduced by making surface roughness of the sheave surface Ra 0.5 to 3.0 μm.

However, the present inventors have determined that even when surface roughness of the sheave surface is in this range (Ra 0.5 to 3.0 μm), abrasion loss of the V-belt is not necessarily reduced. That is, even when the surface roughness of the sheave surface is in this range, some V-belts have a small amount of abrasion loss while other V-belts have a large amount of abrasion loss.

SUMMARY OF THE INVENTION

The invention has been thought of in view of these circumstances and reduces abrasion loss of a V-belt in a belt type continuously variable transmission, thus increasing the service life of the belt type continuously variable transmission.

The inventors have determined that attention should be paid to the relationship between groove pitch and surface hardness of the sheave surface to reduce abrasion loss of the V-belt.

As shown in FIG. 1, a plurality of grooves 3 aligned at a predetermined pitch P in a radial direction are formed on a sheave surface 1 and have dimensions defined by depth D and pitch P. A surface roughness parameter is dependent on depth D of the grooves 3 but irrelevant to pitch P. Therefore, it is thought that surface roughness alone cannot adequately define the magnitude of irregularities of sheave surface 1.

In examining abrasion of the V-belt, contact pressure acted on the V-belt from a sheave surface is important. Larger contact pressure is more liable to abrade the V-belt. Where grooves 3 are formed on sheave surface 1, contact pressure is varied according to the pitch P of grooves 3. When pitch P of grooves 3 is small, the contact area between sheave surface 1 and V-belt 2 becomes large, so that contact pressure becomes relatively small. Conversely, when pitch P of grooves 3 is large, a contact area between the sheave surface 1 and V-belt 2 becomes small, so that contact pressure becomes relatively large. In this manner, contact pressure is seriously influenced by pitch P of grooves 3 rather than a depth D of grooves 3 (influences of surface roughness).

From this viewpoint, the inventors have examined the relationship between groove pitch and surface hardness of a sheave surface and thought of the following invention.

A belt type continuously variable transmission according to the invention comprises a primary sheave, a secondary sheave, and a V-belt wound round and contacting the primary sheave and the secondary sheave. The V-belt is at least partially formed from a resin. A plurality of grooves aligned in a radial direction of the sheaves are formed on a sheave surface of at least one of the primary sheave and the secondary sheave. An average pitch P(mm) of the grooves is $P \leqq -0.08K \times 10^{-3} + 0.18$, where K(Hv) indicates surface hardness of the sheave surface.

A method of manufacturing a sheave of a belt type continuously variable transmission is also provided. The method comprises forming a plurality of grooves aligned on a sheave surface in a radial direction of the sheaves. The grooves meet the equation $P \leqq -0.08K \times 10^{-3} + 0.18$ where P(mm) indicates an average pitch of the grooves and K(Hv) indicates surface hardness of the sheave surface. Plating is applied to the sheave surface on which the grooves are formed.

According to the invention, a belt type continuously variable transmission having a V-belt with reduced abrasion loss and longer service life is provided.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIGS. 2(a) and 2(b) are tables of data of specimens used in tests according to an embodiment of the invention.

FIG. 12($a$) is a front view of a sheave surface of a primary sheave according to an embodiment of the invention; and FIG. 12($b$) is a cross sectional view of the primary sheave in a radial direction.

FIG. 13($a$) is a front view of a sheave surface of a secondary sheave according to an embodiment of the invention; and FIG. 13($b$) is a cross sectional view of the secondary sheave in a radial direction.

FIG. 14 is a front view of a sheave surface according to a modified embodiment of the invention.

FIG. 15 is a side view of a V-belt according to an embodiment of the invention.

FIG. 16 is a cross sectional view of the V-belt taken along line XVI-XVI of FIG. 15.

FIG. 17($a$) shows a state in which a V-belt according to an embodiment of the invention is wound at the time of Low; and FIG. 17($b$) shows a state in which the V-belt is wound at the time of Top.

FIG. 18 is a cross sectional view of a sheave surface portion, according to a modified embodiment of the invention, in a radial direction.

FIG. 19 is a cross sectional view of a sheave surface portion, according to a further modified embodiment of the invention, in a radial direction.

FIG. 20 is a cross sectional view of a sheave surface portion, according to a further modified embodiment of the invention, in a radial direction.

FIG. 21 is a front view of a sheave surface according to a modified embodiment of the invention.

FIG. 22 is a front view of a sheave surface according to a further modified embodiment of the invention.

DETAILED DESCRIPTION OF THE INVENTION

Before explaining an embodiment of the invention, the circumstances giving rise to the invention are first explained.

Figure 4:
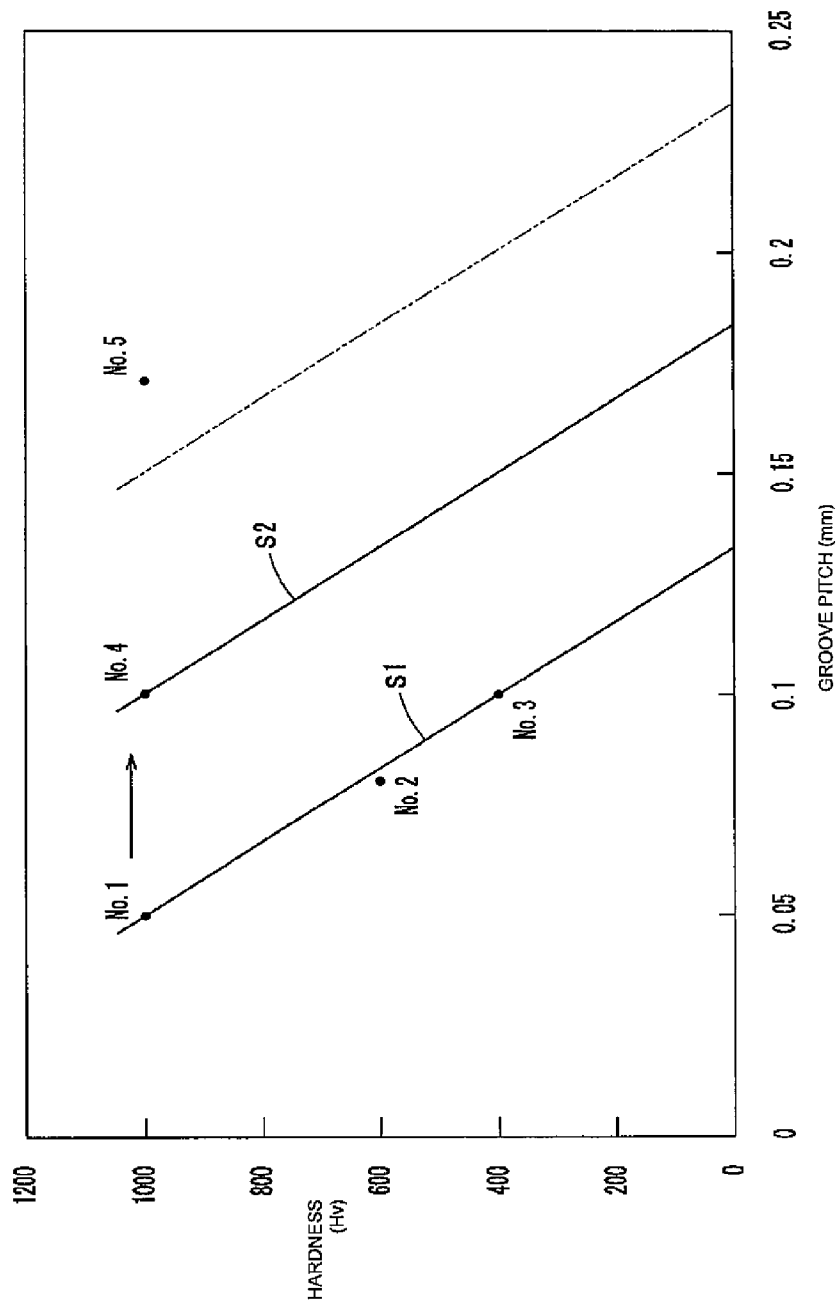
FIG. 4 is a graph of the relationship between groove pitch and surface hardness of a sheave surface according to an embodiment of the invention.

The inventors have found that two parameters, groove pitch and surface hardness, of a sheave surface are important to abrasion of a V-belt in a belt type continuously variable transmission (CVT). As groove pitch increases, contact pressure increases and the V-belt becomes liable to abrade. As groove pitch decreases, contact pressure decreases and the V-belt is less liable to abrade. On the other hand, as surface hardness of a sheave surface increases, the V-belt becomes liable to abrade while as surface hardness decreases, the V-belt is less liable to abrade. The inventors have found that a characteristic representative of the degree to which a V-belt is susceptible of abrasion can be approximately represented by a rightward lowering, straight line in a graph, in which groove pitch is indicated on an axis of abscissa and surface hardness is indicated on an axis of ordinates (FIG. 4). That is, when being present on the straight line, the V-belt is substantially constant in an abraded state.

Figure 1:
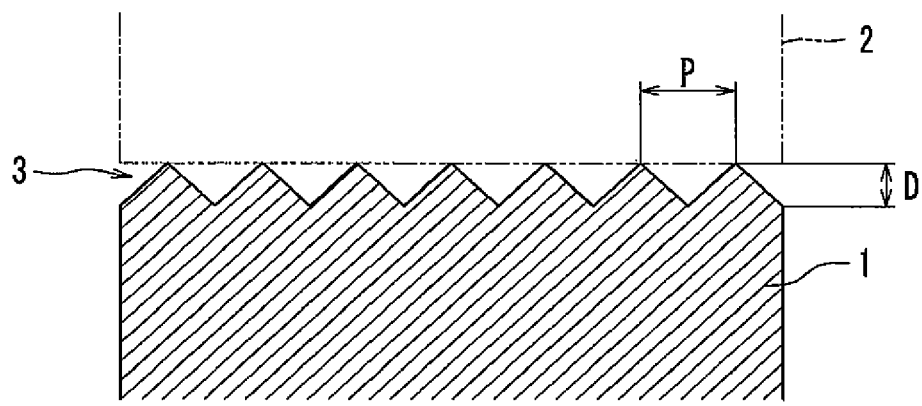
FIG. 1 is a cross sectional view taken in a radial direction through a sheave, illustrating a state according to an embodiment of the invention in which a sheave surface and a V-belt contact each other.
Figure 3:
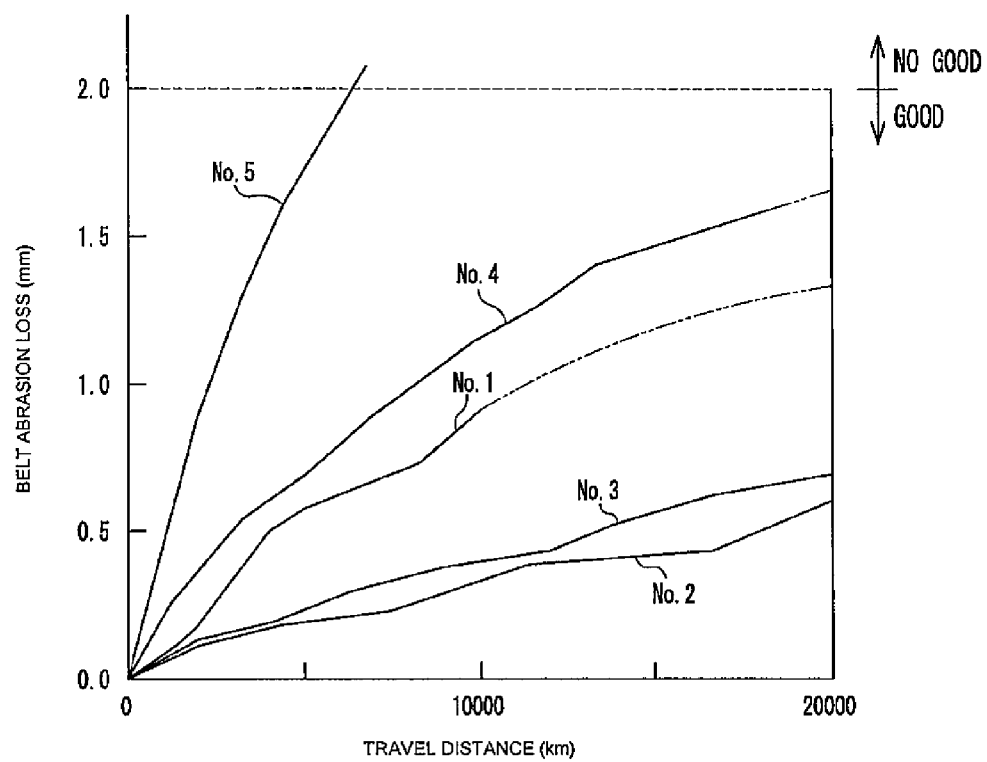
FIG. 3 is a graph of test results with respect to travel distance and belt abrasion loss according to an embodiment of the invention.

The inventors performed tests to examine the state of abrasion of a V-belt. FIGS. 2($a$) and 2($b$) show data of specimens used in the tests. FIG. 3 is a graph illustrating results of the tests and showing belt abrasion loss in a width direction (left and right direction in FIG. 16) of a V-belt versus travel distance.

In motorcycles, it is conventionally thought that no practical problems are caused when the belt abrasion loss is 2 mm or less over a travel distance of 20000 km. When a V-belt abrades, the CVT generates an error in speed change ratio, but such errors can be absorbed via known speed change ratio correction techniques (see, for example, WO2004/044457A1, WO2005/090828A1 and WO2006/009014A1).

When belt abrasion loss is 2 mm or less over a travel distance of 20000 km, the state of the V-belt is determined to be favorable. Thus, "GOOD" in the "ABRADED STATE" column in FIGS. 2($a$) and 2($b$) indicates that belt abrasion loss is 2 mm or less and that the state of the V-belt is favorable. "NO GOOD", by contrast, indicates that belt abrasion loss exceeds 2 mm and that the state of the V-belt is not favorable. Tests on some specimens were terminated when travel distance was short of 20000 km. A two-dot chain line in FIG. 3 is a characteristic curve predicted from previous characteristics.

FIG. 4 is a graph, in which the relationship between groove pitch and surface hardness for specimens Nos. 1 to 5 are plotted. As described above, that degree, to which a V-belt is susceptible of abrasion, can be approximately represented by a rightward lowering, straight line. As the result of the tests, specimen No. 1 was favorable in belt state. Accordingly, at least a rightward lowering, straight line passing through a point of specimen No. 1 can be drawn as a boundary line, on which abrasion of a V-belt is permissible.

Here, inclination of the straight line is problematic. Referring to FIG. 3, however, specimen nos. 2 and 3 are favorable in belt state, and are actually more favorable in belt state than specimen No. 1. In FIG. 4, since it is thought that a belt state becomes favorable as it goes leftwardly of the straight line, it is expected that the boundary line passing through the point of specimen no. 1 would pass on the right of respective points of specimen nos. 2 and 3. Therefore, it is estimated that in the case where a straight line S1 passing through respective points of Specimens Nos. 1 and 3 is tentatively drawn, a belt state is favorable in at least a region below straight line S1.

Specimen nos. 1, 4, and 5, which are equal to one another in surface hardness, are now examined (see FIG. 2($b$)). As seen from FIG. 3, the belt state worsens in the order of specimen nos. 1, 4, and 5 but the belt states of specimen nos. 1 and 4 are in a favorable range. Therefore, it can be thought in FIG. 4 that straight line S1 is shifted rightward and it is thought that a boundary line, on which abrasion of a V-belt is permissible, passes between points of specimen nos. 4 and 5 (see the imaginary line in FIG. 4). Accordingly, in the case where a straight line S2 in parallel to straight line S1 and passing through a point of Specimen No. 4 is drawn, it is estimated that the belt state is favorable in at least a region below straight line S2.

Straight line S2 is represented by $P = -0.08K \times 10^{-3} + 0.18$ where P(mm) indicates groove pitch and K(Hv) indicates surface hardness of a sheave surface. Therefore, according to the embodiment of the invention, the CVT is designed so as to meet the equation $P \leq -0.08K \times 10^{-3} + 0.18$.

Also, as described above, it is thought that a lubricating ability between a sheave and a V-belt is preserved mainly by powder (abrasion powder) generated from a V-belt. From the viewpoint of favorably holding abrasion powder on a sheave surface, it is preferable to maintain a groove depth and a groove pitch on a sheave surface in a predetermined range. Here, an arithmetical mean roughness Ra and a ten-point mean roughness Rz are known as physical quantities representative of a groove depth.

In case of using the arithmetical mean roughness Ra, even when irregularities large in magnitude are present locally, whole measured values are less influenced by the irregularities, so that it is possible to obtain stable results as a whole. In the case where excessive irregularities are present here and there on a sheave surface, however, the irregularities promote abrasion of the V-belt and influences thereof become relatively large. Therefore, it is difficult to correctly evaluate such influences with the arithmetical mean roughness Ra. On the other hand, in case of using the ten-point mean roughness Rz, when irregularities being large in magnitude are present locally, influences thereof are taken into consideration to some extent. Therefore, in taking account of abrasion of a V-belt, evaluation adapted to actual circumstances can be done by using the ten-point mean roughness Rz rather than the arithmetical mean roughness Ra.

Hereupon, a ten-point mean roughness Rz of a sheave surface, on which the grooves are formed, is preferable to be, for example, $0.5 \ \mu m \leq Rz \leq 10 \ \mu m$.

An embodiment of the invention is now described in detail with reference to the drawings.

Figure 5:
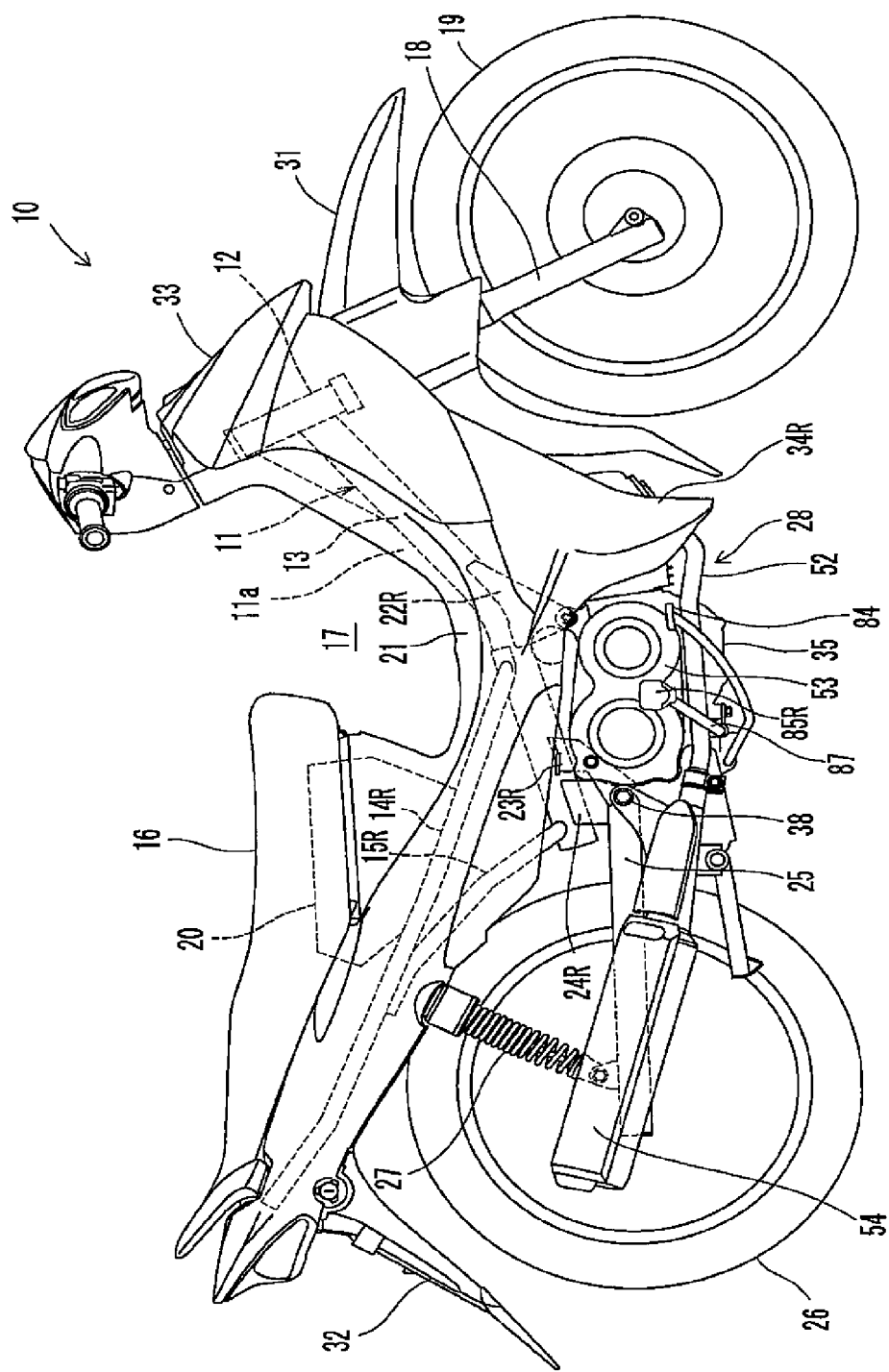
FIG. 5 is a side view showing a motorcycle according to an embodiment of the invention.

As shown in FIG. 5, a straddle type vehicle according to one embodiment is a motorcycle 10. Motorcycle 10 comprises a body frame 11 and a seat 16. A straddle type vehicle according to the invention may be a moped-type motorcycle, as illustrated in FIG. 5, a motorcycle- or scooter-type motorcycle, or another straddle type vehicle such as an ATV.

In the following description, the terms "front", "rear", "left" and "right" refer to directions from the perspective of a rider seated on seat 16. Body frame 11 comprises a steering head pipe 12, a single main frame 13 extending rearwardly and obliquely downwardly of steering head pipe 12, left and right seat rails 14L (see FIG. 6), 14R extending rearwardly and obliquely upwardly of an intermediate portion of main frame 13, and left and right seat pillar tubes 15L, 15R connected to a rear end of the main frame 13 and intermediate portions of seat rails 14L, 14R.

Upper and left and right sides of body frame 11 are covered by a body cover 21. A space 17, which is recessed downwardly and concave-shaped in side view, is defined above body cover 21 and forward of seat 16. A center tunnel 11a defines a passage for main frame 13 below body cover 21.

A front wheel 19 is supported on steering head pipe 12 by a front fork 18. A fuel tank 20 and seat 16 are supported on seat rails 14L, 14R. Seat 16 extends toward rear ends of seat rails 14L, 14R above fuel tank 20. Fuel tank 20 is arranged above front halves of seat rails 14L, 14R and covered by body cover 21 and seat 16.

A pair of first left and right engine brackets 22L, 22R (see FIGS. 7 and 8) are provided on the intermediate portion of main frame 13 to project downward. Pairs of second left and right engine brackets 23L, 23R (see FIG. 9) and rear arm brackets 24L, 24R are provided on the rear end of main frame 13 (see FIGS. 7 and 8).

Rear arm brackets 24L, 24R project downward from the rear end of main frame 13. A pivot shaft 38 is provided on rear arm brackets 24L, 24R and a front end of a rear arm 25 is supported on pivot shaft 38 to be able to swing as shown in FIG. 5. A rear wheel 26 is supported on a rear end of rear arm 25. A rear half of rear arm 25 is suspended from body frame 11 through a cushioning unit 27.

Figure 9:
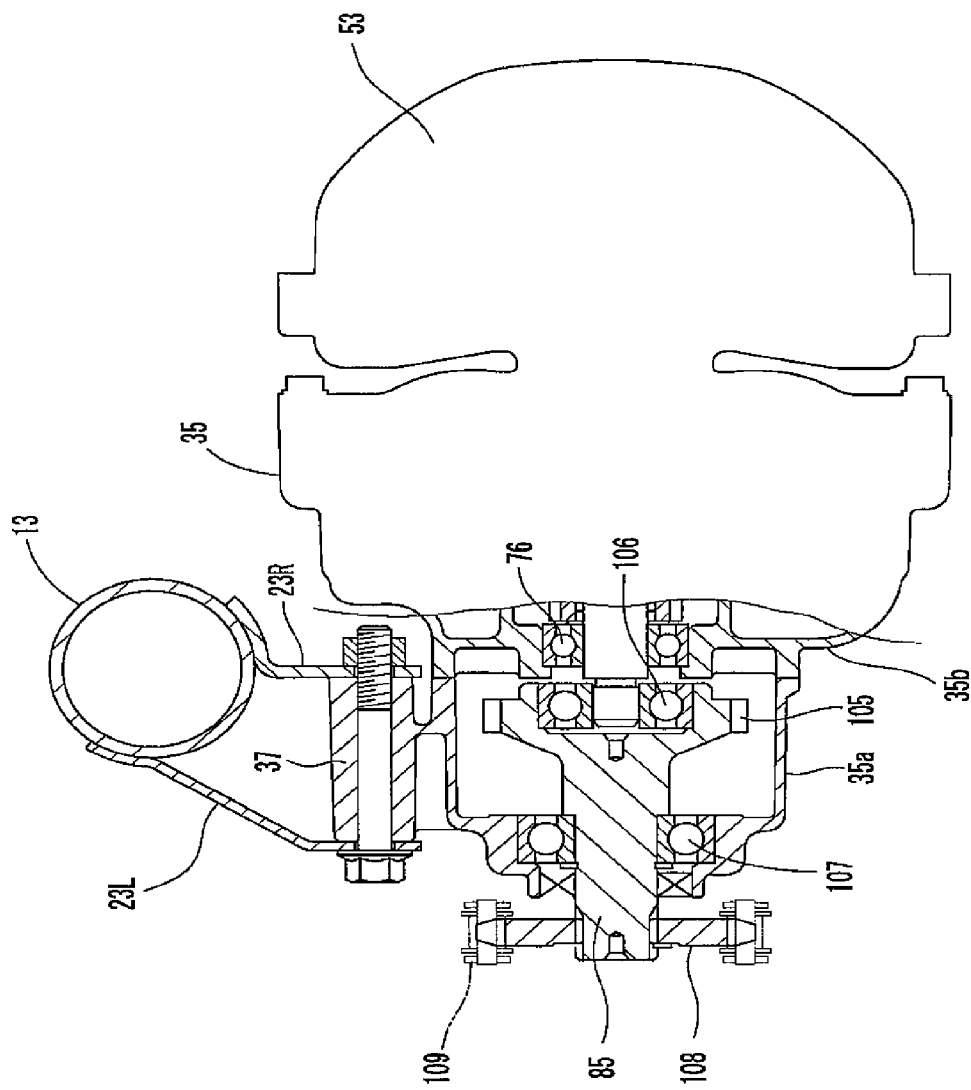
FIG. 9 is a cross sectional view showing a state in which the engine unit is mounted.

As shown in FIG. 9, second engine brackets 23L, 23R project downward from the rear end of main frame 13. Second engine brackets 23L, 23R are opposed to each other with a spacing in a vehicle width direction.

Figure 8:
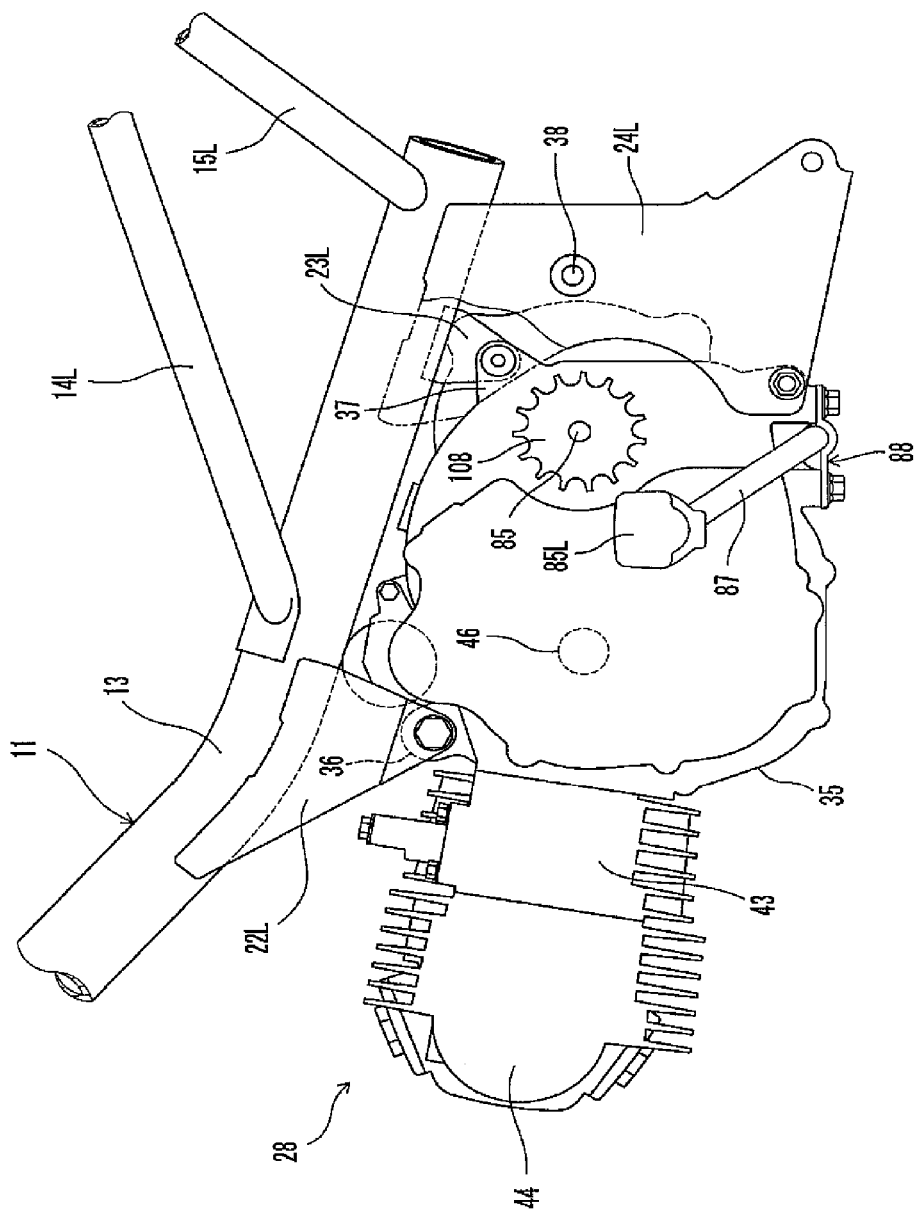
FIG. 8 is a left side view of the engine unit.

As shown in FIG. 5, an engine unit 28 that drives rear wheel 26 is supported on body frame 11 is. As shown in FIG. 8, engine unit 28 comprises a crank case 35, a cylinder 43, and a cylinder head 44. Crank case 35 comprises first and second engine mounts 36, 37. First engine mount 36 projects upward from an upper side of a front end of crank case 35 to be supported on first engine brackets 22L, 22R. Second engine mount 37 projects rearward and obliquely upward from an upper side of a rear end of crank case 35 to be supported on second engine brackets 23L, 23R (also, see FIG. 9). Therefore, crank case 35 is suspended from main frame 13.

Figure 10:
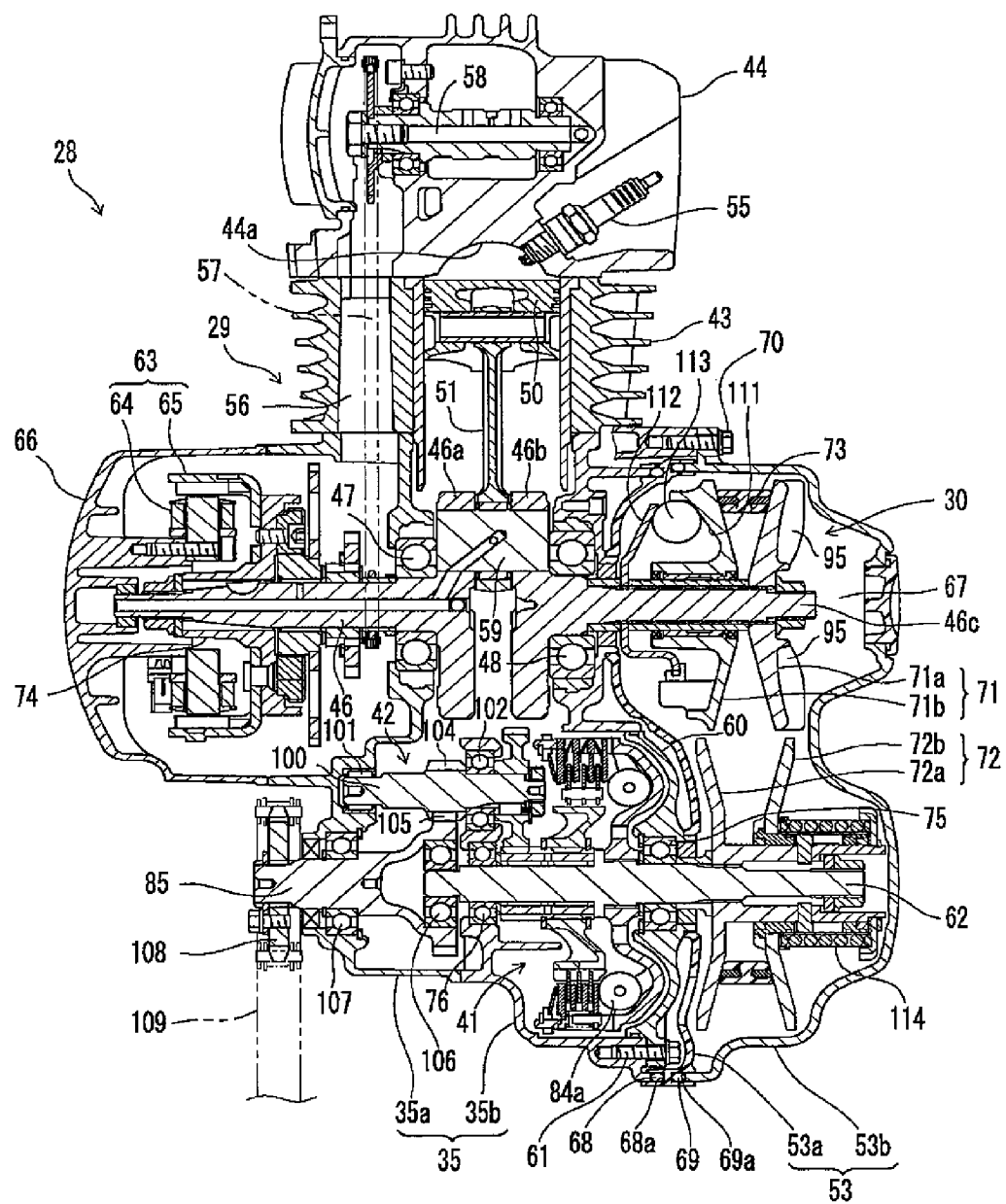
FIG. 10 is a cross sectional view of an internal structure of the engine unit.

Engine unit 28 comprises an engine 29 and a belt type continuously variable transmission (CVT) 30 (see FIG. 10). While engine 29 is in no way limited in type, it comprises a four-stroke single cylinder engine in the embodiment.

A front fender 31 covers upper and rear portions of front wheel 19, and a rear fender 32 covers a rearward and obliquely upward portion of rear wheel 26. A front cowl 33, and left and right leg shields 34L, 34R (see FIG. 6) are also provided.

Figure 6:
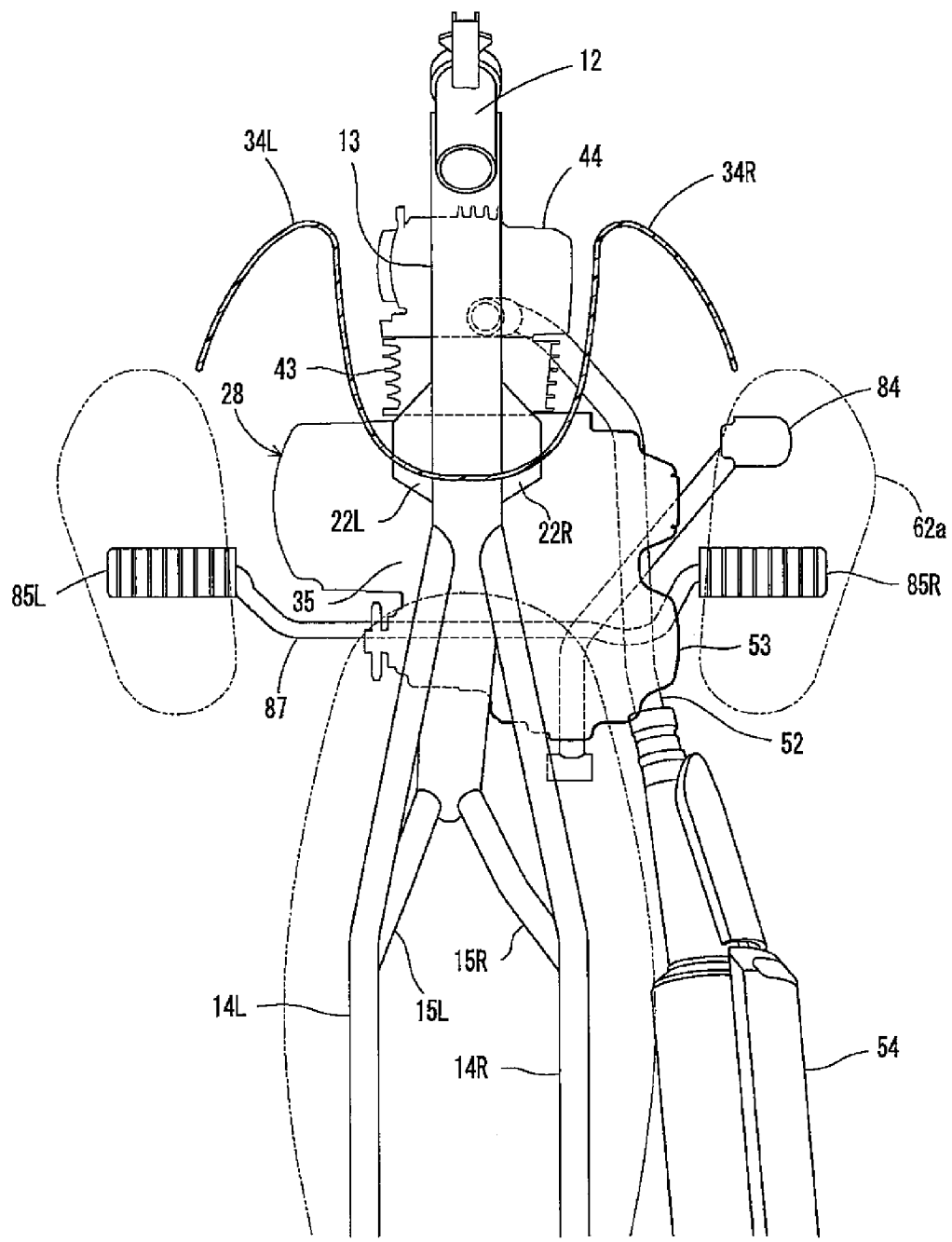
FIG. 6 is a plan view of the motorcycle showing positional relationships among components such as a body frame, leg shields and an engine unit.

As shown in FIG. 6, foot rests 85L, 85R made of rubber or the like are arranged on the left and the right of engine unit 28. Foot rests 85L, 85R are supported on crank case 35 of engine unit 28 through a metallic connecting rod 87 and a mount plate 88 (see FIGS. 7 and 8) fixed to connecting rod 87.

As shown in FIGS. 5 and 6, a brake pedal 84 is provided forwardly of right foot rest 85R. Brake pedal 84 passes below a transmission casing 53 to project rightward and obliquely forward to extend forward and obliquely upward on the right of transmission casing 53. As shown in FIG. 6, a driver's right foot 62a is adjacent transmission casing 53 in the vehicle width direction during travel.

An internal structure of engine unit 28 is now described. As shown in FIG. 10, engine unit 28 comprises engine 29, the CVT 30, a centrifugal clutch 41, and a speed reducer 42.

Engine 29 comprises crank case 35, cylinder 43 connected to crank case 35, and cylinder head 44 connected to cylinder 43. Crankcase 35 comprises two split case blocks, that is, a first case block 35a positioned on the left and a second case block 35b positioned on the right. First case block 35a and second case block 35b abut in the vehicle width direction.

A crank shaft 46 is accommodated in crank case 35. Crank shaft 46 is extended in the vehicle width direction and arranged horizontally. Crank shaft 46 is supported on first case block 35a with a bearing 47 therebetween and supported on second case block 35b with a bearing 48 therebetween.

A piston 50 is inserted slidably into cylinder 43. An end of a connecting rod 51 is connected to piston 50. A crank pin 59 is provided between a left crank arm 46a and a right crank arm 46b of crank shaft 46. The other end of connecting rod 51 is connected to crank pin 59.

Figure 7:
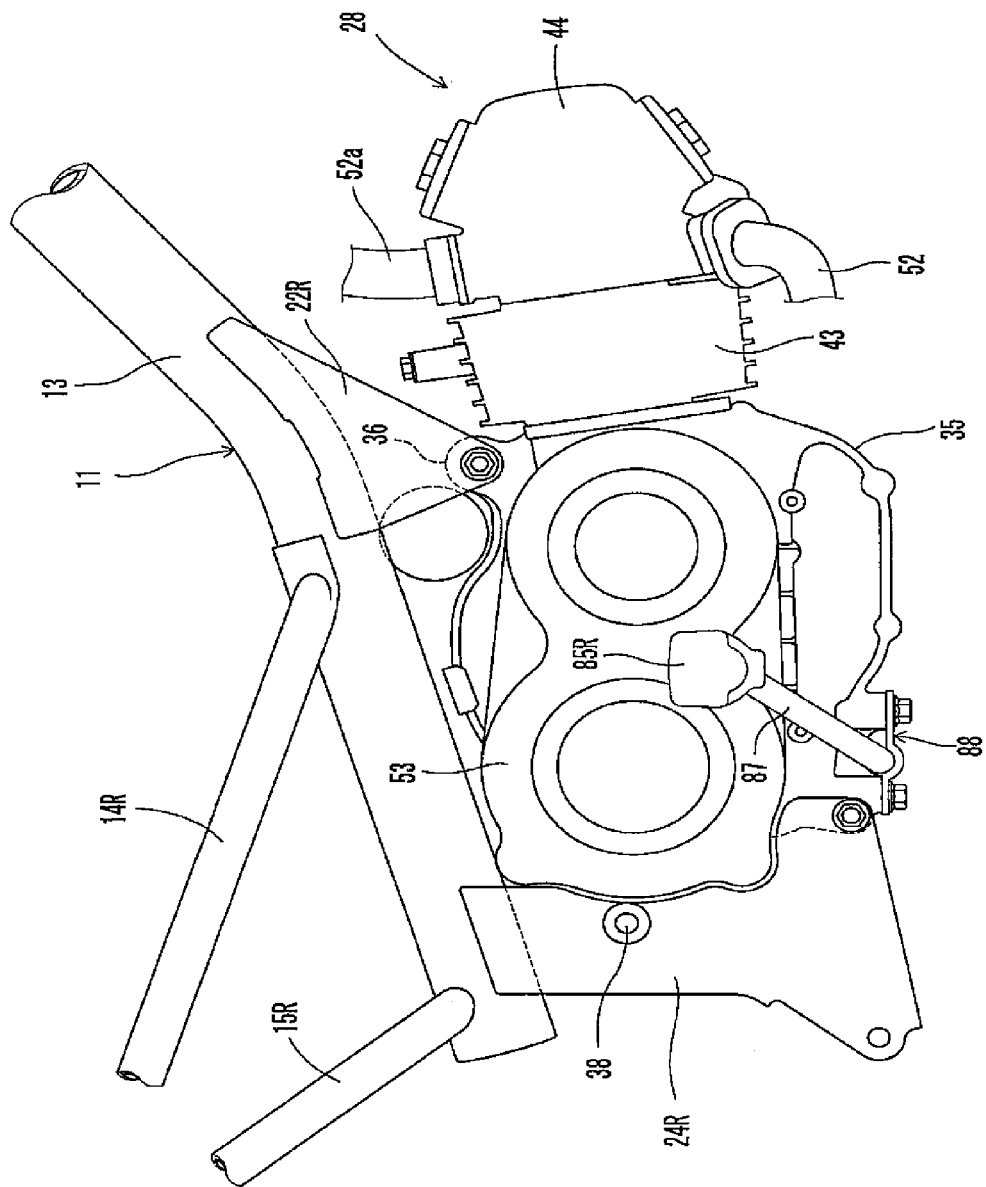
FIG. 7 is a right side view of the engine unit.

Intake and exhaust ports communicated to a recess 44a are formed in cylinder head 44. An ignition plug 55 is inserted into recess 44a of cylinder head 44. As shown in FIG. 7, an intake pipe 52a is connected to the intake port and an exhaust pipe 52 is connected to the exhaust port. As shown in FIGS. 5 and 6, exhaust pipe 52 is extended rearwardly rightward and obliquely downward from cylinder head 44 and passes below transmission casing 53 of engine unit 28 to be extended further rearward to be connected to a muffler 54 arranged on the right side of rear wheel 26.

As shown in FIG. 10, formed on a left side in cylinder 43 is a cam chain chamber 56, which connects between an interior of crank case 35 and an interior of cylinder head 44. A timing chain 57 is arranged in cam chain chamber 56. Timing chain 57 is wound around crank shaft 46 and a cam shaft 58. Cam shaft 58 rotates upon rotation of crank shaft 46 to open and close an intake valve and an exhaust valve, which are not shown.

A generator casing 66 is detachably mounted to a left side of a front half of first case block 35a to accommodate therein a generator 63. Transmission casing 53 is mounted to a right side of second case block 35b to accommodate therein CVT 30.

An opening is formed on a right side of a rear half of second case block 35b, and is closed by a clutch cover 60. Clutch cover 60 is detachably fixed to second case block 35b by a bolt 61.

Transmission casing 53 is formed independently of crank case 35 and comprises an inner casing 53a, which covers an inside (left) of CVT 30 in the vehicle width direction, and an outer casing 53b, which covers an outside (right) of CVT 30 in the vehicle width direction. Inner casing 53a is mounted to a right side of crank case 35 and outer casing 53b is mounted to a right side of inner casing 53a. A belt chamber 67 is formed in inner casing 53a and outer casing 53b to accommodate therein CVT 30.

As shown in FIG. 10, a right end of crank shaft 46 extends through second case block 35b and inner casing 53a to be extended to belt chamber 67. A primary sheave 71 of CVT 30 is fitted into the right end of crank shaft 46. Therefore, primary sheave 71 rotates upon rotation of crank shaft 46. A right portion (a portion on the right of bearing 48) of crank shaft 46 is formed with a primary sheave shaft 46c.

A left end of crank shaft 46 extends through first case block 35a to be extended into generator casing 66. Generator 63 is mounted to the left end of crank shaft 46. Generator 63 comprises a stator 64 and a rotor 65 opposed to stator 64. Rotor 65 is fixed to a sleeve 74 that rotates with crank shaft 46. Stator 64 is fixed to generator casing 66.

Figure 11:
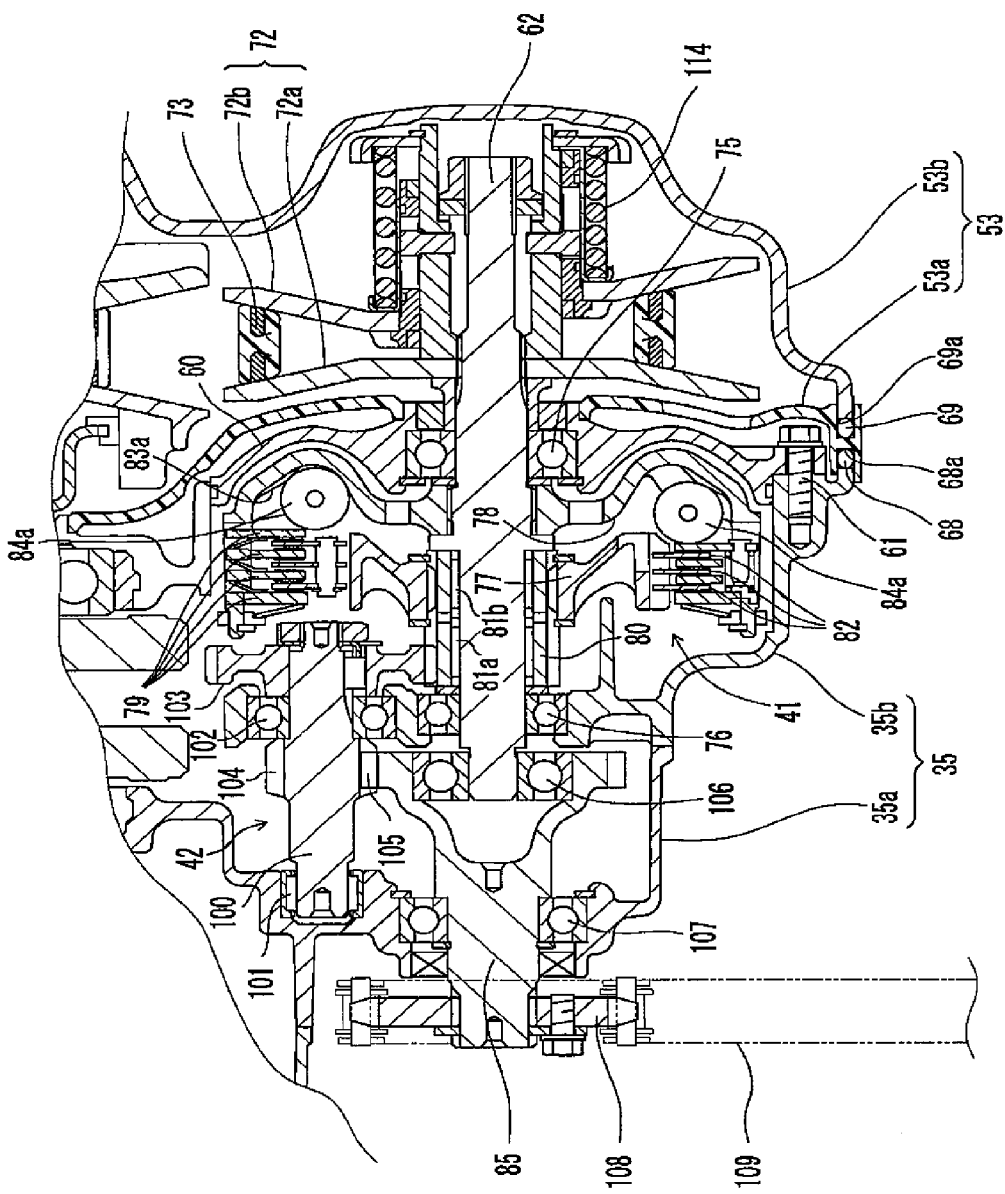
FIG. 11 is a cross sectional view of a part of the internal structure of the engine unit.

A secondary sheave shaft 62 is arranged in the rear half of crank case 35 in parallel to crank shaft 46. As shown in FIG. 11, a central portion of secondary sheave shaft 62 is supported on clutch cover 60 with a bearing 75 therebetween. Also, a left portion of secondary sheave shaft 62 is supported on a left end of second case block 35b with a bearing 76 therebetween.

A right end of secondary sheave shaft 62 extends through second case block 35b and clutch cover 60 to be extended to belt chamber 67. A secondary sheave 72 of CVT 30 is connected to the right end of secondary sheave shaft 62.

As shown in FIG. 10, CVT 30 comprises primary sheave 71, secondary sheave 72, and a V-belt 73 wound around primary sheave 71 and secondary sheave 72. Primary sheave 71 is mounted to a right side of crank shaft 46. Secondary sheave 72 is connected to a right side of secondary sheave shaft 62.

Primary sheave 71 comprises a stationary sheave half 71a positioned outward in the vehicle width direction and a movable sheave half 71b positioned inward in the vehicle width direction and opposed to stationary sheave half 71a. Stationary sheave half 71a is fixed to a right end of primary sheave shaft 46c to rotate with primary sheave shaft 46c. Movable sheave half 71b is arranged on the left of stationary sheave half 71a and mounted slidably to primary sheave shaft 46c. Accordingly, movable sheave half 71b rotates with primary sheave shaft 46c and is slidable axially of primary sheave shaft 46c. A belt groove is formed between stationary sheave half 71a and movable sheave half 71b.

A cooling fan 95 is provided on an outer side (right side in FIG. 10) of stationary sheave half 71a. A cam surface 111 is formed on a left portion of movable sheave half 71b and a cam plate 112 is arranged on the left of cam surface 111. A roller weight 113 is arranged between cam surface 111 of movable sheave half 71b and cam plate 112.

Secondary sheave 72 comprises a stationary sheave half 72a positioned inward in the vehicle width direction and a movable sheave half 72b positioned outward in the vehicle width direction and opposed to stationary sheave half 72a. Movable sheave half 72b is mounted to the right end of secondary sheave shaft 62. Movable sheave half 72b rotates together with secondary sheave shaft 62 and is slidable axially of secondary sheave shaft 62. A compression spring 114 is provided on the right end of secondary sheave shaft 62 and movable sheave half 72b is biased leftward by compression spring 114. An axial portion of stationary sheave half 72a is in the form of a cylindrical-shaped slide collar and spline-fitted onto secondary sheave shaft 62.

A reduction ratio in CVT 30 is decided by the magnitude correlation between a force, with which roller weight 113 pushes movable sheave half 71b of primary sheave 71 rightward, and a force, with which compression spring 114 pushes movable sheave half 72b of secondary sheave 72 leftward.

That is, when primary sheave shaft 46c is increased in rotational frequency, roller weight 113 is exerted by a centrifugal force to move radially outward to push movable sheave half 71b rightward. Then movable sheave half 71b is moved rightward, so that primary sheave 71 is increased in belt wound diameter. In keeping with this, secondary sheave 72 is decreased in belt wound diameter, so that movable sheave half 72b of secondary sheave 72 is moved rightward against the bias of compression spring 114. Consequently, V-belt 73 on primary sheave 71 is increased in wound diameter while secondary sheave 72 is decreased in wound diameter, so that the reduction ratio decreases.

On the other hand, when primary sheave shaft 46c is decreased in rotational frequency, a centrifugal force on roller weight 113 decreases, so that roller weight 113 is moved radially inward along cam surface 111 of movable sheave half 71b and cam plate 112. Therefore, a force, with which roller weight 113 pushes movable sheave half 71b rightward, decreases. Then the bias of compression spring 114 exceeds the force relatively, so that movable sheave half 72b of secondary sheave 72 is moved leftward and movable sheave half 71b of primary sheave 71 is also moved leftward correspondingly. Consequently, primary sheave 71 is decreased in belt wound diameter while secondary sheave 72 is increased in belt wound diameter, so that the reduction ratio increases.

The materials for stationary sheave half 71a and movable sheave half 71b of primary sheave 71, and for stationary sheave half 72a and movable sheave half 72b of secondary sheave 72 are not especially limited. Metal such as aluminum, iron, stainless steel, etc. may be used. Also, surfaces of the members may be subjected to surface treatment such as chrome plating.

According to one embodiment of the invention, stationary sheave half 71a and movable sheave half 71b of primary sheave 71 are formed from aluminum or an aluminum alloy. Hard chrome plating is applied to sheave surfaces (surfaces in contact with V-belt 73) of stationary sheave half 71a and movable sheave half 71b of primary sheave 71. Consequently, stationary sheave half 71a and movable sheave half 71b have a sheave surface hardness of about 1000 Hv.

Stationary sheave half 72a and movable sheave half 72b of secondary sheave 72 are formed from stainless steel (SUS304). Sheave surfaces of stationary sheave half 72a and movable sheave half 72b of secondary sheave 72 are not subjected to chrome plating. Consequently, stationary sheave half 72a and movable sheave half 72b have a sheave surface hardness of about 400 Hv.

In this manner, according to the embodiment, secondary sheave 72 is lower in sheave surface hardness than primary sheave 71. However, primary sheave 71 and secondary sheave 72 may be the same in sheave surface hardness.

As shown in FIGS. 12 and 13, according to the embodiment, spiral-shaped grooves 91 are formed on sheave surfaces of stationary sheave half 71a, movable sheave half 71b, stationary sheave half 72a, and movable sheave half 72b in contact with V-belt 73.

Specifically, as shown in FIGS. 12(a) and 12(b), a plurality of grooves 91 aligned at predetermined pitch P in a diametrical direction are formed on sheave surfaces of stationary sheave half 71a and movable sheave half 71b of primary sheave 71 by means of a turning process. Also, as shown in FIGS. 13(a) and 13(b), similar grooves 91 are formed on sheave surfaces of stationary sheave half 72a and movable sheave half 72b of secondary sheave 72 by means of a turning process.

Grooves 91 according to the embodiment are formed to be spiral about an axis 92 of sheave halves 71a, 71b, 72a, 72b. As shown in FIGS. 12(b) and 13(b), cross sections of sheave halves 71a, 71b, 72a, 72b in a radial direction are formed by grooves 91 to be concave and convex. As shown in FIG. 12(b), plating 93 is applied to sheave surfaces of stationary sheave half 71a and movable sheave half 71b of primary sheave 71. According to the embodiment, the plating comprises chrome plating. That is, chrome plated layer 93 are formed on the sheave surfaces of stationary sheave half 71a and movable sheave half 71b. In this manner, according to the embodiment, in the manufacture of stationary sheave half 71a and movable sheave half 71b, grooves 91 are first formed on the sheave surfaces by means of turning process, and then plating is applied to the sheave surfaces.

Grinding may also be used to form the grooves on the sheave surfaces. However, a turning process is preferable.

The grooves are not limited to spiral grooves. As shown in FIG. 14, for example, a plurality of concentric grooves 91a centered on an axis of the sheaves may be formed on the sheave surfaces. To suitably hold abrasion powder, the cross sections of sheave halves 71a, 71b, 72a, 72b in a radial direction are preferably concave and convex by the grooves on the sheave surfaces.

Here, the pitch P(mm) is represented by $P \leq -0.08K \times 10^{-3} + 0.18$ where K(Hv) indicates surface hardness of a sheave surface.

The pitch P and the surface hardness K may be $P \leq 0.1$ and $K \leq 1000$. In particular, $0.05 \leq P \leq 0.1$ and $400 \leq K \leq 1000$ is suitable. Of course, the pitch P and the surface hardness K may be the same as those of specimen nos. 1 to 4 in FIGS. 2(a) and 2(b).

The structure of V-belt 73 is now described. As shown in FIGS. 15 and 16, V-belt 73 comprises a plurality of resin blocks 73a arranged in one direction, and a pair of connecting bodies 73b connecting between resin blocks 73a. As shown in FIG. 16, resin blocks 73a are substantially trapezoid-shaped so as to follow the belt grooves of primary sheave 71 and secondary sheave 72. Recesses 73c recessed inward are formed on left and right sides of resin blocks 73a.

Connecting bodies 73b are formed to be endless. As shown in FIG. 15, connecting bodies 73b are extended in a direction, in which resin blocks 73a are aligned, and fitted into recesses 73c of respective resin blocks 73a. In this manner, connecting bodies 73b are fitted into recesses 73c of resin blocks 73a so that resin blocks 73a are connected together through connecting bodies 73b. Connecting bodies 73b are formed from rubber. As shown in FIG. 16, a plurality of lengths of core wire 73d for reinforcement are embedded in the rubber. Left and right sides of resin blocks 73a and connecting bodies 73b of V-belt 73 constitute contact surfaces in contact with sheave surfaces of primary sheave 71 and secondary sheave 72.

According to the invention, it is sufficient that at least a part of the V-belt in contact with the sheave surfaces is formed from a resin, and the form of the V-belt is not limited one in which resin blocks 73a are connected by connecting bodies 73b.

As shown in FIG. 10, a sealing groove 68a is formed on a left side of a peripheral edge of inner casing 53a and a right side of a peripheral edge of second case block 35b is fitted into sealing groove 68a. An O-ring 68 is inserted between inner casing 53a and second case block 35b in sealing groove 68a. A sealing groove 69a is formed on a right side of the peripheral edge of inner casing 53a and a peripheral edge of outer casing 53b is fitted into sealing groove 69a. An O-ring 69 is inserted between inner casing 53a and outer casing 53b in sealing groove 69a. Outer casing 53b and second case block 35b are clamped by bolts 70 in a state, in which inner casing 53a is interposed therebetween.

As shown in FIG. 11, centrifugal clutch 41 is mounted to a left portion of secondary sheave shaft 62. Centrifugal clutch 41 comprises a wet multi-disc type clutch provided with a substantially cylindrical-shaped clutch housing 78 and a clutch boss 77. Clutch housing 78 is spline-fitted onto secondary sheave shaft 62 to rotate integrally with secondary sheave shaft 62. A plurality of ring-shaped clutch plates 79 are mounted to clutch housing 78. Clutch plates 79 are aligned at intervals axially of secondary sheave shaft 62.

A cylindrical-shaped gear 80 is fitted rotatably around the left portion of secondary sheave shaft 62 with two bearings 81a, 81b therebetween. Clutch boss 77 is arranged radially inwardly of clutch plates 79 and radially outwardly of gear 80 to mesh with gear 80. Therefore, gear 80 rotates with clutch boss 77. A plurality of ring-shaped friction plates 82 are mounted radially outwardly of clutch boss 77. Friction plates 82 are aligned at intervals axially of secondary sheave shaft 62, the respective friction plates 82 being arranged between adjacent clutch plates 79, 79.

A plurality of cam surfaces 83a are formed on a left side of the clutch housing 78. Roller weights 84a are arranged between cam surfaces 83a and the right-most clutch plate 79 opposed to cam surfaces 83a.

Centrifugal clutch 41 is automatically switched between a clutch-in state (connected state) and a clutch-off state (disconnected state) according to the magnitude of a centrifugal force acting on roller weights 84a.

That is, when a rotational speed of clutch housing 78 becomes equal to or larger than a predetermined speed, roller weights 84a are exerted by a centrifugal force to move radially outward, so that clutch plates 79 are pushed leftward by roller weights 84a. Consequently, clutch plates 79 and friction plates 82 are brought into pressure contact with each other to bring about the clutch-in state, in which a driving force of secondary sheave shaft 62 is transmitted to an output shaft 85 through gear 80 and speed reducer 42.

On the other hand, when a rotational speed of clutch housing 78 becomes less than the predetermined speed, a centrifugal force acting on roller weights 84a decreases, so that roller weights 84a move radially inward. Consequently, pressure contact between clutch plates 79 and friction plates 82 is released, so that the clutch-off state, in which a driving force of secondary sheave shaft 62 is not transmitted to output shaft 85 through gear 80 and speed reducer 42, is brought about. In FIG. 11, a front portion (an upper side in FIG. 11) in centrifugal clutch 41 represents the clutch-off state and a rear portion (a lower side in FIG. 11) represents the clutch-in state.

Speed reducer 42 is interposed between centrifugal clutch 41 and output shaft 85. Speed reducer 42 includes a speed change shaft 100 arranged in parallel to secondary sheave shaft 62 and output shaft 85. Speed change shaft 100 is supported rotatably on first case block 35a with a bearing 101 therebetween and supported rotatably on second case block 35b with a bearing 102 therebetween. A first speed change gear 103, which meshes with gear 80, is provided on a right end of speed change shaft 100.

A second speed change gear 104, which is smaller in diameter than first speed change gear 103, is provided centrally on speed change shaft 100. A third speed change gear 105, which meshes with second speed change gear 104, is formed on an outer peripheral side of a right end of output shaft 85. The inner peripheral side of the right end of output shaft 85 is supported on a left end of secondary sheave shaft 62 with a bearing 106 therebetween. Accordingly, output shaft 85 is supported rotatably on secondary sheave shaft 62 with bearing 106 therebetween. A central portion of output shaft 85 is supported rotatably on the left end of first case block 35a with a bearing 107 therebetween.

With such construction, clutch boss 77 and output shaft 85 are connected to each other through gear 80, first speed change gear 103, speed change shaft 100, second speed change gear 104, and third speed change gear 105. Therefore, output shaft 85 rotates upon rotation of clutch boss 77.

A left end of output shaft 85 extends through first case block 35a to project outside crankcase 35. A drive sprocket 108 is fixed to the left end of output shaft 85. A chain 109 that transmits a driving force of output shaft 85 to rear wheel 26 is wound around drive sprocket 108. The mechanism that transmits the driving force of output shaft 85 to rear wheel 26 is not limited to chain 109 but may comprise other members such as a transmission belt, a gear mechanism composed of a combination of a plurality of gears, a drive shaft, etc.

As described above, according to the embodiment, grooves 91 are formed on sheave surfaces of sheave halves 71a, 71b of primary sheave 71 and sheave halves 72a, 72b of secondary sheave 72 to be aligned at predetermined pitch P(mm) in the radial direction, wherein $P \leq -0.08K \times 10^{-3} + 0.18$, and K(Hv) indicates the surface hardness of sheave halves 71a, 71b, 72a, 72b. Thereby, the belt abrasion loss of V-belt 73 is reduced while a lubricating ability between sheaves 71, 72 and V-belt 73 is maintained. Accordingly, CVT 30 has a longer service life and improved reliability.

V-belt 73 can be further reduced in belt abrasion loss by meeting $P \leq 0.1$ and $K \leq 1000$, so that CVT 30 is even longer in service life.

Further, by meeting $0.05 \leq P \leq 0.1$ and $400 \leq K \leq 1000$ and setting suitable lower limits for groove pitch P and surface hardness K, abrasion of V-belt 73 and abrasion of sheaves 71, 72 are compatibly prevented while lubricating ability between sheaves 71, 72 and V-belt 73 is maintained. In addition, by suppressing abrasion of sheaves 71, 72, grooves 91 are less susceptible to aged deterioration and the lubricating ability of V-belt 73 can be maintained over a long term.

Also, according to the embodiment, grooves 91 are simply and inexpensively realized by subjecting sheaves 71, 72 to a turning process.

As shown in FIGS. 17(a) and 17(b), with CVT 30 according to the embodiment, a distance between primary sheave 71 and secondary sheave 72 is short as compared with magnitudes of primary sheave 71 and secondary sheave 72. Specifically, a distance L between an axis of primary sheave 71 and an axis of secondary sheave 72 is twice a diameter D2 of secondary sheave 72 or less. Also, both primary sheave 71 and secondary sheave 72 are arranged between an axis of front wheel 19 and an axis of rear wheel 26 (see FIG. 5). Therefore, a ratio of that portion of V-belt 73, which contacts with the sheave surfaces of primary sheave 71 and secondary sheave 72, to a whole thereof is large. Accordingly, while CVT 30 might be liable to abrade since V-belt 73 frequently goes in and out of the sheave grooves, according to the embodiment abrasion of V-belt 73 is suppressed, so there is no problem even though a distance between primary sheave 71 and secondary sheave 72 is short.

-Modification of Groove Configuration-

Groove pitch P according to the described embodiment is uniform. However, grooves on a sheave surface according to the invention are not necessarily uniform.

Grooves on a sheave surface according to the invention may be varied in groove pitch midway in a radial direction. For example, as shown in FIG. 18, groove pitch may change to W2 from W1 midway in a radial direction. Groove pitch changes are not limited to one but may occur twice or more. Groove pitch changes may be such that groove pitch decreases outward from a center in a radial direction (see FIG. 18), or increases. Also, after groove pitch decreases, it may increase again, or vice versa.

Where groove pitch is not uniform, the effect described above can be obtained provided that an average groove pitch P meets the equation, that is, $P \leq -0.08K \times 10^{-3} + 0.18$. The average groove pitch can be defined by, for example, "radial length of that portion, on which grooves are formed,"/"number of grooves in a radial direction as viewed in a radial cross section".

However, a maximum groove pitch among several groove pitches preferably meets the equation. For example, while two groove pitches W1, W2 are present in the example shown in FIG. 18, a maximum groove pitch W1 among them preferably meets the equation $W1 \leq -0.08K \times 10^{-3} + 0.18$.

Also, as shown in FIG. 19, groove pitch may be changed alternately in a radial direction. Even in such case, the effect described above can be obtained provided that an average groove pitch meets the equation. In addition, in this example, a maximum groove pitch W3 among a plurality of groove pitches W3, W4 preferably meets the equation $W3 \leq -0.08K \times 10^{-3} + 0.18$.

Also, groove pitch may be changed randomly in a radial direction. Even in such case, the effect described above can be obtained provided that an average groove pitch meets the equation.

Combinations of the above embodiments are possible. For example, groove pitch may be uniform in a predetermined range in a radial direction and changed once or more in other ranges. Alternatively, groove pitch may be uniform in a predetermined range in a radial direction and changed alternately in other ranges. Or, groove pitch may be uniform in a predetermined range in a radial direction and changed irregularly in other ranges. Groove pitch may be changed alternately in a predetermined range in a radial direction and changed irregularly in other ranges. Groove pitch may be uniform in a predetermined range in a radial direction, changed alternately in a further range, and changed irregularly in a still further range.

Also, while projections formed between grooves on a sheave surface project at acute angles in the embodiment and the modification, tip ends of the projections may be rounded. Also, as shown in FIG. 20, tip ends of projections 91b may be flat. In the case where the tip ends of projections 91b are flat, groove pitch P makes a distance between a position K1, in which one adjacent projection 91b begins to descend, and a position K2, in which the other adjacent projection 91b begins to descend. Where tip ends of projections are rounded or flat, contact surface pressure on a V-belt is advantageously decreased as compared with the case where tip ends of projections are pointed.

As described above, "a plurality of grooves aligned in a radial direction" in the invention means that a plurality of grooves are aligned in a cross section along a radial direction, and does not prescribe that the number of grooves is plural when a sheave surface is viewed from the front. Also, the grooves are not limited to spiral-shaped grooves 91 (see FIG. 12(a)) but may comprise concentric grooves 91a (see FIG. 14(a)). Also, spiral-shaped grooves do not necessarily comprise a single continuous groove as viewed in front view but may comprise a plurality (two in an example shown in FIG. 21) of spiral-shaped grooves.

Grooves aligned in a radial direction and formed discretely in a circumferential direction, as shown in FIG. 22, are also acceptable.

As described above, the invention is useful in belt type continuously variable transmissions, straddle type vehicle provided therewith, and a method of manufacturing a sheave of a belt type continuously variable transmission.

The particular embodiments of the invention described in this document should be considered illustrative, rather than restrictive. Modification to the described embodiments may be made without departing from the spirit of the invention as defined by the following claims.

The invention claimed is:

1. A belt type continuously variable transmission comprising:
   a primary sheave made of metal,
   a secondary sheave made of metal, and
   a V-belt wound round and contacting the primary sheave and the secondary sheave, and being at least partially formed from a resin, and wherein
   a plurality of grooves aligned in a radial direction of the sheaves are formed on a sheave surface of at least one of the primary and secondary sheaves,
   an average pitch P(mm) of the grooves is $P \leq -0.08K \times 10^{-3} + 0.18$, where K(Hv) indicates surface hardness of the sheave surface, and
   a ten-point mean roughness Rz of a sheave surface, on which the plurality of grooves are formed, is $0.5 \ \mu m \leq Rz \leq 10 \ \mu m$.

2. The belt type continuously variable transmission according to claim 1, wherein $P \leq 0.1$ and $K \leq 1000$.

3. The belt type continuously variable transmission according to claim 1, wherein $0.05 \leq P \leq 0.1$ and $400 \leq K \leq 1000$.

4. The belt type continuously variable transmission according to claim 1, wherein the grooves on the sheave surface are formed by a turning process.

5. The belt type continuously variable transmission according to claim 1, wherein the grooves on the sheave surface comprise a spiral groove or concentric grooves about an axis of the sheave.

6. The belt type continuously variable transmission according to claim 1, wherein groove pitch varies midway in the radial direction.

7. The belt type continuously variable transmission according to claim 6, wherein the groove pitch decreases outward from a center in the radial direction.

8. The belt type continuously variable transmission according to claim 6, wherein the groove pitch increases outward from a center in the radial direction.

9. The belt type continuously variable transmission according to claim 6, wherein the groove pitch changes alternately in the radial direction.

10. The belt type continuously variable transmission according to claim 6, wherein the groove pitch changes randomly in the radial direction.

11. The belt type continuously variable transmission according to claim 1, wherein tip ends of projections formed between the grooves are pointed.

12. The belt type continuously variable transmission according to claim 1, wherein tip ends of projections formed between the grooves are rounded.

13. The belt type continuously variable transmission according to claim 1, wherein tip ends of projections formed between the grooves are flat.

14. The belt type continuously variable transmission according to claim 1, wherein the grooves are formed discretely in a circumferential direction.

15. The belt type continuously variable transmission according to claim 1, wherein the metal is aluminum, stainless steel, or iron.

16. The belt type continuously variable transmission according to claim 1, wherein a distance between an axis of the primary sheave and an axis of the secondary sheave is twice a diameter of the secondary sheave or less.

17. A straddle type vehicle comprising the belt type continuously variable transmission according to claim 1.

18. The straddle type vehicle according to claim 17, comprising a front wheel and a rear wheel, and wherein both the primary sheave and the secondary sheave are arranged between an axis of the front wheel and an axis of the rear wheel in a longitudinal direction of the vehicle.

19. A method of manufacturing a sheave of a belt type continuously variable transmission, which comprises a primary sheave made of metal, a secondary sheave made of metal, and a V-belt wound round and contacting the primary sheave and the secondary sheave, the V-belt being at least partially formed from a resin, the sheave being the primary sheave or the secondary sheave, the method comprising the steps of:
   forming a plurality of grooves aligned on a sheave surface in a radial direction of the sheaves, wherein an average pitch P(mm) of the grooves is $P \leq -0.08K \times 10^{\times 3} + 0.18$, where K(Hv) indicates surface hardness of the sheave surface, and
   applying plating to that sheave surface, on which the grooves are formed, wherein
   a ten-point mean roughness Rz of a sheave surface, on which the plurality of grooves are formed, is $0.5 \ \mu m \leq Rz \leq 10 \ \mu m$.

20. The method according to claim 19, wherein the plating is chrome plating.

* * * * *

UNITED STATES PATENT AND TRADEMARK OFFICE
CERTIFICATE OF CORRECTION

| | | |
|---|---|---|
| PATENT NO. | : 7,857,721 B2 | Page 1 of 1 |
| APPLICATION NO. | : 11/776403 | |
| DATED | : December 28, 2010 | |
| INVENTOR(S) | : Yousuke Ishida et al. | |

It is certified that error appears in the above-identified patent and that said Letters Patent is hereby corrected as shown below:

Column 13, line 43 (Claim 1, line 12) should read as follows:

-- $^3$ + 0.18, where K(Hv) indicates surface hardness of the --

Column 14, line 50 (Claim 19, line 11) should read as follows:

-- pitch P(mm) of the grooves is P ≤ -0.08K × $10^{-3}$ + 0.18, --

Signed and Sealed this
Twelfth Day of July, 2011

David J. Kappos
*Director of the United States Patent and Trademark Office*